Nov. 25, 1924.

R. E. BRIGGS

BELT SUPPORTING IDLER

Filed July 26, 1921

1,516,666

INVENTOR
Robert E. Briggs
BY
ATTORNEY

Patented Nov. 25, 1924.

1,516,666

UNITED STATES PATENT OFFICE.

ROBERT E. BRIGGS, OF COLUMBUS, OHIO, ASSIGNOR TO THE JEFFEREY MANUFACTURING COMPANY, OF COLUMBUS, OHIO, A CORPORATION OF OHIO.

BELT-SUPPORTING IDLER.

Application filed July 26, 1921. Serial No. 487,640.

*To all whom it may concern:*

Be it known that I, ROBERT E. BRIGGS, a citizen of the United States, residing at Columbus, in the county of Franklin and State of Ohio, have invented certain new and useful Improvements in Belt-Supporting Idlers, of which the following is a specification, reference being had therein to the accompanying drawing.

The present invention relates to certain new and useful improvements in belt supporting idlers of the type adapted to support a conveyor belt such as is used for the transportation either of packages or bulk material.

The especial object of this invention is to provide a belt idler having a plurality of belt supporting pulleys which may be arranged in horizontal alignment to hold the belt flat for the transportation of packages, or which may be conveniently and expeditiously adjusted to inclined position whereby the belt will be longitudinally bent to form a trough suitable for the transportation of grain or similar bulk material.

The means whereby I attain this object are fully set forth in the following specification reference being had to the accompanying drawing of which—

Like numerals refer to similar parts in the several figures.

Figure 1:
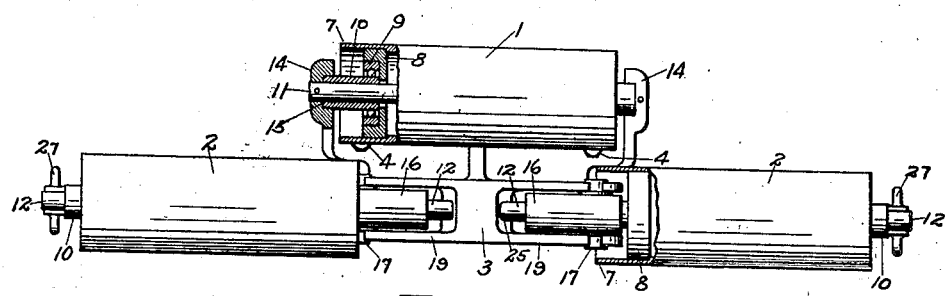
Fig. 1 is a plan view of the preferred embodiment of my invention.

As shown in the drawings my improved belt supporting idler comprises a horizontal middle pulley 1 and two adjustable side pulleys 2 supported upon a base frame 3 which is adapted to be attached, by suitable attachment bolts 4, to any convenient part of the supporting structure, such as a transversely extending plank 5. The pulleys 1 and 2 are adapted to lie in the same horizontal plane to afford a roller bearing to a flat conveyor belt 6 adapted to transport boxes or packages, and the side pulleys 2 may if desired be upwardly inclined to longitudinally bend the belt to form a trough to prevent bulk material, such as grain and the like, from spilling along its edges.

The pulleys may be of any preferred construction. For purposes of illustration I have shown pulleys each composed of a tubular shell 7 into each end of which is pressed a disk like head 8. The heads 8 are formed with recesses adapted to receive the outer race members 9 of ball bearings. The inner race members 10 of these ball bearings extend longitudinally beyond the ends of the pulleys and are provided with longitudinal bores which fit snugly upon the spindle shafts 11 and 12 of the respective pulleys.

The spindle 11 of the middle pulley 1 is rigidly supported in apertures 13 of the upwardly projecting end brackets 14 formed on the base frame 3, and sockets 15 in these end brackets, concentric with the apertures 13, receive the projecting ends of the ball race members 10. The spindles 12 of the side pulleys 2 are each supported in a swivel casting 16 having trunnions 17 adapted to be journaled in apertures 18 of the transversely extending arms 19 of the base frame. Each spindle 12 is longitudinally slidable in its swivel casting 16, and is held at the inner limit of its longitudinal movement by a compression spring 20 contained in a recess of said swivel casting and abutting against a thrust collar 21 fixed to the spindle. Relatively narrow slots 22 extend upwardly from the apertures 18, and the trunnions 17 have been cut away on their upper side at 23 so that when the swivel casting 16 is turned into a vertically extending position the trunnions may be readily passed through these slots. It will thus be seen that the pulleys 1 and 2 together with their bearings, spindles, and supporting swivels, constitute self contained units which may be conveniently applied to or removed from the supporting base.

Between the arms 19 the base frame 3 has an upward extension 24 in which are formed apertures 25 and 26 adapted to engage the ends of the spindles 12 when they are at the inner extremity of their longitudinal movement in either position of adjustment about the axes of the trunnions 17. Pull rings 27 attached to the outer ends of the spindles 12 afford convenient means for withdrawing the spindles from the apertures 25 or 26, and for rotating the pulleys 2 from one position of adjustment to the other.

Figure 2:
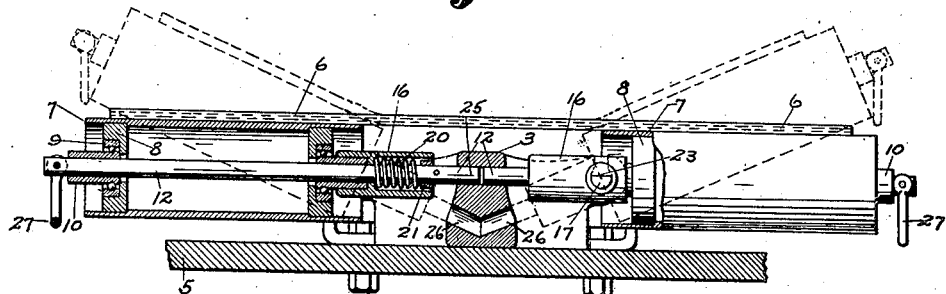
Fig. 2 is a side elevation, partly in section, of the device illustrated in Fig. 1.
Figure 3:
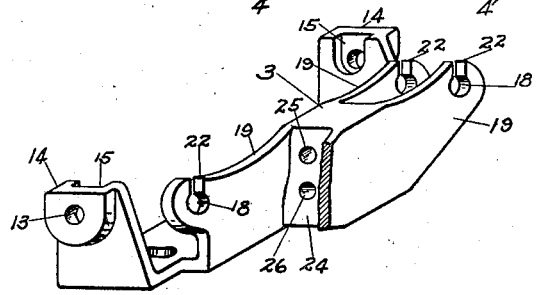
Fig. 3 is a perspective detail of the supporting frame certain parts being broken away to reveal other parts.

From this it will be seen that the projected outer ends of the spindles 12 and the apertures 25 and 27 in the extension 24 of the base frame 3, provide a spring latch arrangement by means of which, as shown clearly in Fig. 2, the pulleys may be adjusted to and held in various angular positions simply by allowing the spring projected latching ends of the spindles 12 to engage any pair of the plurality of seats or apertures 25 and 26 that may be desired. Retraction of the latching ends of the spindles by the pull rings 27 will, of course, release the spindles from engagement. While two sets of latching seats or apertures have been shown, it will be understood that this is merely illustrative, and more than two, to provide for varying positions of the pulleys, may be provided if desired.

When it is desired to transport packages, or similar articles, upon the belt 6 the pulleys 2 will be adjusted to their horizontal position with the inner ends of the spindles 12 engaging the apertures 25, thereby permitting the belt to lie in straight transverse lines on which said packages may advantageously ride. If, however, the material to be transported is in bulk form of a fine or granular character, the spindles 12 may be drawn longitudinally outward to compress the springs 20 and disengage said spindles from the apertures 25. The pulleys 2 may then be rotated about the trunnions 17 to the inclined position, indicated by the dotted lines on Fig. 2 of the drawing, and the spindles 12 released to allow their inner ends to engage the apertures 26 and securely hold the pulley in the inclined position, causing the belt 6 to be longitudinally bent upwardly forming a trough, preventing the fine material from spilling along its edges.

What I claim is—

1. In a mechanism of the class described, the combination with a supporting frame, of a pivot member having trunnions removably supported in journal bearings of said frame, a spindle carried by said pivot member and extending transversely of said trunnions, means to hold said pivot member in either of a plurality of adjusted positions about the axis of said trunnions, and a pulley rotatably mounted on said spindle as and for the purpose set forth.

2. In a mechanism of the class described, the combination with a supporting frame, of a pivot member having trunnions removably supported in horizontally extending journal bearings of said frame, a spindle carried by said pivot member and extending transversely of said trunnions, means to hold said pivot member in either of a plurality of adjusted positions about the axis of said trunnions, and a pulley rotatably mounted on said spindle as and for the purpose set forth.

3. In a mechanism of the class described, the combination with a supporting frame, of a spindle mounted therein and adapted to rotate about a transverse horizontal axis, a latch arranged to retain said spindle in either of a plurality of adjusted positions about said axis, and a pulley rotatably mounted upon said spindles as and for the purpose set forth.

4. In a mechanism of the class described, the combination with a supporting frame, of a spindle mounted therein and adapted to rotate about a transverse horizontal axis, a spring pressed latch adapted to retain said spindle in either of a plurality of adjusted positions about said axis, and a pulley rotatably mounted on said spindle as and for the purpose set forth.

5. In a mechanism of the class described, the combination with a supporting frame, of a spindle mounted in said frame and angularly adjustable relative thereto, a latch associated with said spindle adapted to maintain it in either of several positions of angular adjustment, and a pulley rotatably mounted on said spindle as and for the purpose set forth.

6. In a mechanism of the class described, the combination with a supporting frame, of a spindle mounted in said frame and angularly adjustable relative thereto, a latch associated with said spindle adapted to engage apertures in said frame to hold said spindle in either of several positions of angular adjustment, and a pulley rotatably mounted on said spindle as and for the purpose set forth.

7. In a mechanism of the class described, the combination with a supporting frame, of a pivot member mounted thereon and adapted to rotate about a horizontal axis, a spindle carried by said pivot member extending transversely of said axis adapted to limited longitudinal movement relative thereto and adapted to engage with either of a plurality of apertures in said frame, and a pulley rotatably mounted on said spindle as and for the purpose set forth.

8. In a mechanism of the class described, the combination with a supporting frame, of a pivot member mounted thereon and adapted to rotate about a horizontal axis, a spindle carried by said pivot member extending transversely of said axis adapted to limited longitudinal movement relative thereto and adapted to engage with either of a plurality of apertures in said frame, means to retain said spindle in said engagement, and a pulley rotatably mounted upon said spindle as and for the purpose set forth.

9. In a mechanism of the class described, the combination with a supporting frame, of a pivot member mounted thereon and adapted to rotate about a horizontal axis, a spindle carried by said pivot member extending transversely of said axis adapted to limited longitudinal movement relative thereto and adapted to engage with either of a plurality of apertures in said frame, resilient means to retain said spindle in said engagement, and a pulley rotatably mounted on said spindle as and for the purpose set forth.

10. In a mechanism of the class described, the combination of a supporting frame, a pulley mounted for angular adjustment in said frame, a fixed member having selective means to maintain said pulley in different positions, relatively movable means to engage one of said selective means and hold said pulley in predetermined angular position, and means tending to hold the parts in engaged position.

11. In a mechanism of the class described, the combination of a supporting frame, a pulley mounted for angular adjustment in said frame, a fixed member having selective means to maintain said pulley in different positions, manually operable means carried by said pulley to engage one of said selective means and hold said pulley in predetermined angular position, and means tending normally to maintain said parts in engaged position.

12. In a mechanism of the class described, the combination of a supporting frame, a pulley mounted for angular adjustment in said frame, selective means to maintain said pulley in different positions, and means operable in a direction substantially logitudinally of said pulley to engage one of said selective means and hold said pulley in predetermined angular position.

13. In a mechanism of the class described, the combination of a supporting frame, a pulley angularly adjustable in said frame, a latch member movable axially of said pulley, a fixed member having a plurality of latch engaging means, any one of which may be engaged by said latch to hold said pulley in a predetermined position.

14. In a mechanism of the class described, the combination of a supporting frame, a pulley mounted in said frame for angular adjustment, a latch movable longitudinally with respect to said pulley, a fixed member having a plurality of latch engaging seats to hold said pulley in a predetermined angular position, and means tending normally to hold said latch in engagement with a seat.

15. In a mechanism of the class described, the combination of a supporting frame, a pulley mounted in said frame for angular adjustment, a latch movable longitudinally with respect to said pulley, a fixed member having a plurality of latch engaging seats to hold said pulley in a predetermined angular position, means tending normally to hold said latch in engagement with a seat, and manually operable means for withdrawing said latch.

16. In a mechanism of the class described, the combination of a supporting frame, a pulley mounted in said frame for angular adjustment, a spring projected latch movable longitudinally of said pulley, a fixed member having latch engaging seats, and manually operable means for disengaging said spring latch.

17. In a mechanism of the class described, the combination of a supporting frame, a pulley mounted in said frame for angular adjustment, a spindle traversing said pulley, and a plurality of spindle engaging means to maitain said pulley in different angular position, said spindle and spindle engaging means being movable for engagement and disengagement.

18. In a mechanism of the class described, the combination of a supporting frame, a pulley mounted in said frame for angular adjustment, a spindle traversing said pulley and movable longitudinally relative thereto, and a plurality of spindle engaging means to maintain said pulley in different angular position.

19. In a mechanism of the class described, the combination of a supporting frame, a pulley mounted in said frame for angular adjustment, a spindle traversing said pulley and movable longitudinally thereof, means tending normally to move said spindle in one direction, and a plurality of spindle engaging means to maintain said pulley in different angular position.

20. In a mechanism of the class described, the combination of a supporting frame, a pulley mounted in said frame for angular adjustment, a spindle traversing said pulley and movable longitudinally thereof, means tending normally to move said spindle in one direction, means for moving said spindle in the opposite direction, and a plurality of spindle engaging means to maintain said pulley in different angular positions.

21. In a mechanism of the class described, the combination of a supporting frame, a pulley mounted in said frame for angular adjustment, a spindle traversing said pulley, a spring tending to move said spindle in one direction longitudinally of said pulley, means for moving said spindle in an opposite direction, and a plurality of spindle engaging means to maintain said pulley in different angular positions.

22. In a mechanism of the class described, the combination of a supporting frame, a pulley mounted in said frame for angular adjustment, a spring projected spindle traversing said pulley lengthwise, manually operable means for moving said spindle in an opposite direction against the action of its spring, and a plurality of spindle engaging means to maintain said pulley in different angular positions.

In testimony whereof, I affix my signature.

ROBERT E. BRIGGS.